United States Patent
Takeda et al.

(10) Patent No.: US 11,235,711 B2
(45) Date of Patent: Feb. 1, 2022

(54) AUTOMOBILE DOOR SEALING STRUCTURE

(71) Applicants: Nishikawa Rubber Co., Ltd., Hiroshima (JP); MAZDA MOTOR CORPORATION, Hiroshima (JP)

(72) Inventors: Kazuyuki Takeda, Hiroshima (JP); Hisatoshi Kinoshita, Aki-gun (JP); Noboru Shouno, Hiroshima (JP); Yusuke Migaki, Nanjing (CN)

(73) Assignees: Nishikawa Rubber Co., Ltd., Hiroshima (JP); MAZDA MOTOR CORPORATION, Hiroshima (JP)

( * ) Notice: Subject to any disclaimer, the term of this patent is extended or adjusted under 35 U.S.C. 154(b) by 219 days.

(21) Appl. No.: 16/559,100

(22) Filed: Sep. 3, 2019

(65) Prior Publication Data
US 2020/0079298 A1 Mar. 12, 2020

(30) Foreign Application Priority Data
Sep. 6, 2018 (JP) .............................. JP2018-166478

(51) Int. Cl.
| | |
|---|---|
| *B60R 13/06* | (2006.01) |
| *B60J 10/20* | (2016.01) |
| *B60J 5/04* | (2006.01) |
| *B60R 13/02* | (2006.01) |
| *B60J 10/21* | (2016.01) |
| *B60J 10/76* | (2016.01) |

(52) U.S. Cl.
CPC ............. *B60R 13/06* (2013.01); *B60J 5/0402* (2013.01); *B60J 10/20* (2016.02); *B60R 13/0243* (2013.01); *B60J 10/21* (2016.02); *B60J 10/76* (2016.02)

(58) Field of Classification Search
CPC ..... B60R 13/06; B60J 5/0402; B60J 13/0243; B60J 10/20; B60J 10/88; B60J 10/21; B60J 10/86; B60J 10/76
See application file for complete search history.

(56) References Cited

U.S. PATENT DOCUMENTS

| | | | | |
|---|---|---|---|---|
| 5,806,247 | A | * 9/1998 | Yamamoto | ............. B60J 10/248 49/475.1 |
| 2002/0035806 | A1 | 3/2002 | Yamashita | |
| 2002/0078631 | A1* | 6/2002 | Hock | ..................... B60J 5/0402 49/502 |

(Continued)

FOREIGN PATENT DOCUMENTS

| | | |
|---|---|---|
| JP | 255529 Y2 | 8/1997 |
| JP | 2002-103984 A | 4/2002 |

*Primary Examiner* — Phi D A
(74) *Attorney, Agent, or Firm* — Renner, Otto, Boisselle & Sklar, LLP

(57) ABSTRACT

Disclosed is a structure in which no gap that allows water entry between a weather strip and a glass run is formed in a situation where the weather strip at an upper frame portion of a window frame extends gradually downwardly apart from the glass run. An upper glass run portion is provided with a door panel sealing lip. The door panel sealing lip is provided with a gradually varying portion such that a downward protruding length of the door panel sealing lip increases. The gradually varying portion is disposed so as to contact an outer sealing lip of the weather strip.

8 Claims, 12 Drawing Sheets

(56) References Cited

U.S. PATENT DOCUMENTS

| | | | | |
|---|---|---|---|---|
| 2003/0168814 | A1* | 9/2003 | Struyven | B60J 10/79 |
| | | | | 277/402 |
| 2008/0030046 | A1* | 2/2008 | Krause | B60J 10/18 |
| | | | | 296/146.2 |
| 2010/0026042 | A1* | 2/2010 | Ellis | B60J 10/88 |
| | | | | 296/146.2 |
| 2012/0091746 | A1* | 4/2012 | Zimmer | B60J 10/30 |
| | | | | 296/93 |
| 2013/0074417 | A1* | 3/2013 | Kawai | B60J 10/85 |
| | | | | 49/490.1 |
| 2013/0305612 | A1* | 11/2013 | Murree | B60J 10/32 |
| | | | | 49/483.1 |
| 2014/0007511 | A1* | 1/2014 | Franzen | B60J 10/18 |
| | | | | 49/483.1 |
| 2014/0096452 | A1* | 4/2014 | Inaba | B60J 10/88 |
| | | | | 49/475.1 |
| 2015/0246597 | A1* | 9/2015 | Koike | B60J 10/78 |
| | | | | 49/459 |
| 2016/0059684 | A1* | 3/2016 | Nam | B60J 10/08 |
| | | | | 49/483.1 |
| 2016/0236545 | A1* | 8/2016 | Kaminaga | B60J 5/0402 |
| 2016/0280054 | A1* | 9/2016 | Adachi | B60J 10/21 |
| 2017/0001505 | A1* | 1/2017 | Fukuta | B60J 10/88 |
| 2017/0028938 | A1* | 2/2017 | Yoshida | B60J 10/76 |
| 2017/0036619 | A1* | 2/2017 | Thiel | B60J 10/265 |
| 2017/0355254 | A1* | 12/2017 | Lee | E06B 7/16 |
| 2017/0361693 | A1* | 12/2017 | Miyata | B60J 10/88 |
| 2018/0178640 | A1* | 6/2018 | Nagai | E06B 7/2305 |
| 2019/0084387 | A1* | 3/2019 | Smith | B60J 5/0402 |

\* cited by examiner

EXTERIOR OF VEHICLE CABIN ←

→ INTERIOR OF VEHICLE CABIN

EXTERIOR OF VEHICLE CABIN ← → INTERIOR OF VEHICLE CABIN

AUTOMOBILE DOOR SEALING STRUCTURE

CROSS-REFERENCE TO RELATED APPLICATION

This application claims priority to Japanese Patent Application No. 2018-166478 filed on Sep. 6, 2018, the entire disclosure of which is incorporated by reference herein.

BACKGROUND

The present disclosure relates to an automobile door sealing structure including a glass run mounted to, for example, a window frame of an automobile door, and in particular, to an automobile door sealing structure including a glass run and a weather strip.

There are various types of automobile side doors, one of which has a window frame holding a peripheral portion of a window glass. A door having such a window frame is provided with a glass run for sealing a gap between the window frame and the periphery of the window glass (for example, see Japanese Registered Utility Model No. 2555529).

The glass run described in Japanese Registered Utility Model No. 2555529 is assembled on a window frame from the exterior of a vehicle cabin. Such a glass run configured to be assembled on the window frame from the exterior of the cabin, as described in such a publication, is called a "hidden type" glass run partially covering the window frame from the exterior of the cabin. This glass run may sometimes be adopted due to, e.g., design requirements of a vehicle.

Japanese Unexamined Patent Publication No. 2002-103984 discloses a door weather strip structure including a first weather strip having a hollow seal part and mounted to a window frame at an inner side close to the vehicle cabin, and a second weather strip having a seal lip and mounted to the window frame at an outer side away from the vehicle cabin. The first and the second weather strips provide a seal between the periphery of the window frame and the opening of the vehicle body. An exterior portion, away from the vehicle cabin, of the first weather strip overlaps an interior portion, close to the vehicle cabin, of the second weather strip.

SUMMARY

To provide a better seal, a weather strip having a hollow seal part such as the first weather strip of Japanese Unexamined Patent Publication No. 2002-103984 may be disposed at an interior part, close to the vehicle cabin, of a glass run included in a hidden-type structure.

In this case, an exterior portion, away from the vehicle cabin, of the weather strip is in contact with an interior portion, close to the vehicle cabin, of the glass run to prevent water from entering between the glass run and the weather strip. Without such contact, water such as rain may enter across the glass run and the weather strip into the vehicle cabin.

For example, FIG. 10 illustrates a structure of a glass run 10 and a weather strip 50 mounted on a window frame 3. The glass run 10 has a door panel sealing lip 26 at an inner end close to the vehicle cabin to contact with the window frame 3, and the weather strip 50 has an outer sealing lip 58 at an outer end away from the vehicle cabin. The outer sealing lip 58 is brought in contact with the door panel sealing lip 26 to substantially prevent water from entering a gap between the glass run 10 and the weather strip 50.

If this structure is included in the front door, the glass run 10 linearly extends toward the rear of the vehicle in the upper portion of the window frame 3 but the weather strip 50 curvilinearly extends downward toward the rear end of the window frame 3, which is a typical automobile structure. Therefore, FIG. 11 illustrates a cross-section taken at a position closer to the rear of the vehicle than the cross-section illustrated in FIG. 10 does. In FIG. 11, the weather strip 50 is located at a position (indicated by a solid line in FIG. 11) lower than the position (indicated by a dash double-dot line in FIG. 11) of the weather strip 50 illustrated in FIG. 10. In this lower position, the outer sealing lip 58 of the weather strip 50 is apart from the door panel sealing lip 26 of the weather strip 50, which creates a groove 200 between the outer sealing lip 58 and the door panel sealing lip 26. Through the groove 200, water such as rain may enter the vehicle cabin.

If the structure is included in the rear door, which is not illustrated, the glass run linearly extends toward the front of the vehicle at the upper part of the window frame but the weather strip curvilinearly extends downward toward the front end of the window frame, which is a typical automobile structure. This structure creates a gap as described above, and water such as rain may enter the vehicle cabin through the gap.

The present disclosure has been conceived in view of the above problems, and attempts to substantially prevent water from entering a vehicle cabin by not creating a gap that allows water admission between a glass run and a weather strip mounted on a window frame if the weather strip at the upper part of the window frame extends gradually downwardly apart from the glass run, or in other words, if sealing members are gradually separated from each other.

A first aspect of the present disclosure is directed to an automobile door sealing structure comprising: a glass run mounted to a window frame defining a window opening of an automobile door to provide a seal between the window frame and a window glass; and a weather strip mounted to the window frame and located closer to a cabin than the glass run is, in which the glass run includes an upper glass run portion extending in a front-rear direction of a vehicle along an upper frame portion of the window frame, the upper glass run portion includes a glass run body having an insertion groove into which a glass run mount of the upper frame portion is inserted, the glass run body includes an upper plate portion extending along an upper surface of the glass run mount, a lower plate portion extending along a lower surface of the glass run mount, and an exterior plate portion extending from an exterior end of the upper plate portion to an exterior end of the lower plate portion, the glass run body has a door panel sealing lip protruding downward from an interior end of the upper plate portion to contact the upper frame portion, the door panel sealing lip extending in the front-rear direction, the weather strip includes an upper weather strip extending in the front-rear direction along the upper frame portion, and mounted to a lower portion of a step part in the upper frame portion, the step part being located closer to the cabin than the glass run mount is, and having an exterior upper portion away from the cabin and an interior lower portion closer to the cabin, the upper weather strip includes a hollow seal part configured to elastically deform upon compression by a vehicle body and an outer sealing lip protruding upward from an exterior part of the hollow seal part to contact an interior end surface of the upper plate portion and an interior part of the door panel sealing lip of the glass run body, center portions of the upper weather strip and the upper glass run portion in the front-rear direction extend generally parallel to each other in the front-rear direction, and the upper weather strip extends downwardly apart from the upper glass run portion toward an end in the front-rear direction, and the door panel sealing lip has a gradually varying portion such that a downward protruding length of the door panel sealing lip increases toward an end of the door panel sealing lip in front-rear direction from a position immediately before the upper weather strip is downwardly apart from the upper glass run portion.

According to this configuration, the upper glass run portion is attached to the glass run mount of the window frame from the exterior, and the upper weather strip is attached to be closer to the cabin than the glass run mount of the window frame is. In this state, the outer sealing lip of the upper weather strip is in contact with the interior part of the door panel sealing lip of the upper glass run portion.

Since the center portions of the upper weather strip and the upper glass run portion in the front-rear direction extend generally parallel to each other in the front-rear direction, the outer sealing lip of the upper weather strip is in contact with the door panel sealing lip of the upper glass run portion, thereby substantially preventing water from entering the cabin. The upper weather strip extends downwardly apart from the upper glass run portion toward an end in the front-rear direction, and this may introduce water into the vehicle cabin. In the first aspect, however, the downward protruding length of the door panel sealing lip increases toward its end in the front-rear direction from a position immediately before the upper weather strip is downwardly apart from the upper glass run portion. With this structure, the outer sealing lip of the upper weather strip is in contact with the door panel sealing lip of the upper glass run portion also at a position closer to the end in the front-rear direction, thereby substantially preventing water from entering the cabin.

According to a second aspect of the present disclosure, the center portion of the upper glass run portion in the front-rear direction is an extrusion-molded portion molded by extrusion, and a portion of the upper glass run portion, located closer to an end in the front-rear direction than the extrusion-molded portion is, is a die-molded portion molded using an openable molding die, and the gradually varying portion is provided in the die-molded portion.

That is to say, the downward protruding length of the gradually varying portion gradually increases, and therefore, its longitudinal cross section is not uniform. Such a gradually varying portion is configured as a die-molded portion, and thus, it can be easily obtained.

According to a third aspect of the present disclosure, the gradually varying portion of the door panel sealing lip is tapered toward a lower end of the gradually varying portion.

This configuration allows the gradually varying portion to be tapered downward, and thus, it becomes less likely to form a groove between the weather strip and the glass run.

According to a fourth aspect of the present disclosure, a start point of the gradually varying portion is a cutout or a notch formed upward from a lower end of the door panel sealing lip.

In this configuration, since the cutout or the notch functions as a mark of the start point of the gradually varying portion, the assembling worker can easily visually grasp the start point of the gradually varying portion. Thus, the gradually varying portion can be mounted in a state in which it is positioned in the interior of the vehicle and projects downward.

According to a fifth aspect of the present disclosure, the gradually varying portion is disposed so as to contact a vertical surface forming the step part in the upper frame portion from an interior of the cabin.

This configuration allows the gradually varying portion to contact the vertical surface forming the step part in the upper frame portion to provide sealing properties.

According to a sixth aspect of the present disclosure, the gradually varying portion is sandwiched between the vertical surface and the outer sealing lip in a thickness direction.

This configuration allows the gradually varying portion in the door panel sealing lip to be sandwiched between the vertical surface of the step part in the upper frame portion and the outer sealing lip. This can provide a seal between the vertical surface and the door panel sealing lip and a seal between the door panel sealing lip and the outer sealing lip.

According to the first aspect, if the upper glass run portion and the upper weather strip are mounted to the upper window frame and the upper weather strip extends gradually downwardly apart from the upper glass run portion, the outer sealing lip of the upper weather strip can contact the door panel sealing lip of the upper glass run portion to substantially prevent water from entering the cabin.

According to the second aspect, since the gradually varying portion is configured as a die-molded portion, the gradually varying portion can be easily obtained.

According to the third aspect, the gradually varying portion is tapered downward, and thus, it is less likely to form a groove between the weather strip and the glass run, thereby further improving waterproof characteristics.

According to the fourth configuration, since the assembling worker can easily visually grasp the start point of the gradually varying portion, the worker can assemble the gradually varying portion in a state where the gradually varying portion is positioned in the interior of the vehicle and projects downward. This substantially prevents an assembly error.

According to the fifth aspect, a seal can be provided between the gradually varying portion of the door panel sealing lip and the vertical surface of the step part in the upper frame portion.

According to the sixth aspect, a seal can be provided between the vertical surface of the step part in the upper frame portion and the door panel sealing lip and between the door panel sealing lip and the outer sealing lip.

DETAILED DESCRIPTION

An embodiment of the present disclosure will be described in detail below with reference to the drawings. The following description of advantageous embodiments is only an example in nature, and is not intended to limit the scope, applications, or use of the present disclosure.

Figure 1:
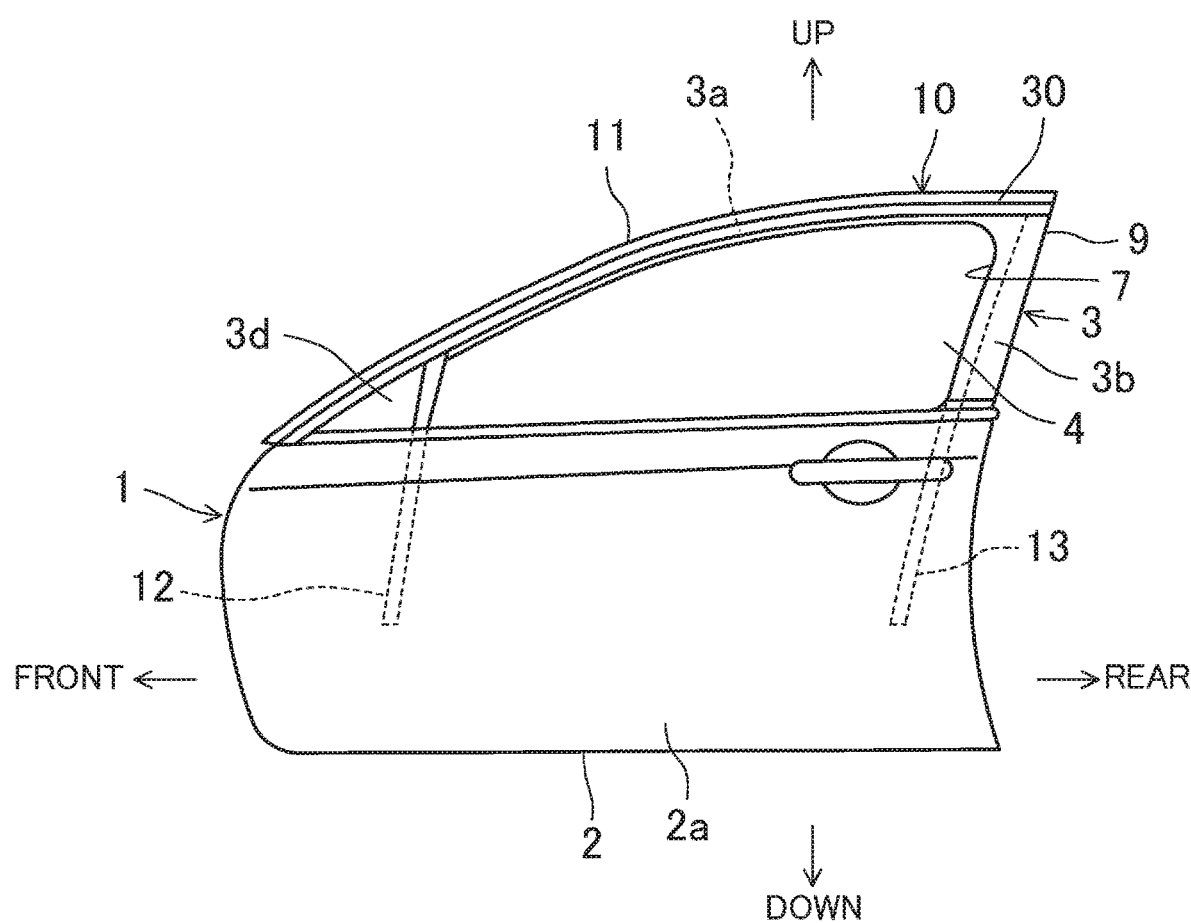
FIG. 1 is a left side view (seen from an exterior of a vehicle) of an automobile door including an automobile door sealing structure according to an embodiment of the present disclosure.

FIG. 1 is a side view of a left front door (automobile door) 1 including the automobile door sealing structure according to the embodiment of the present disclosure seen from the exterior (left side) of a vehicle cabin (hereinafter referred to as "the cabin"). The left front door 1 is installed to the left front side of an automobile (not illustrated), and opens and closes an opening (not illustrated) formed in the left front side of the vehicle. A right front door (not illustrated) and the left front door are symmetrically equipped. The vehicle door glass run according to the present disclosure is mountable on the right and left rear doors (not illustrated). The doors are not limited to hinged doors that are opened or closed about the hinge shaft. The doors may be sliding doors that slide, for example, in a front-rear direction of the vehicle (hereinafter simply referred to as "the front-rear direction").

In the description of this embodiment, the side closer to the front of the vehicle is simply referred to as "front," and the side closer to the rear of the vehicle is simply referred to as "rear." Further, a part of a component located in or closer to the cabin is simply referred to as "an interior part of a component," and a part of a component located away from the cabin is simply referred to as "an exterior part of a component." The direction toward the cabin is simply referred to as "inward," and the direction away from the cabin is simply referred to as "outward."

Structure for Automobile Door

As illustrated in FIG. 1, the left front door 1 includes a door body 2 that is almost a substantially lower half of the left front door 1 and a window frame 3 that is almost a substantially upper half of the left front door 1. Although not shown, a front end of the door body 2 is attached to a pillar of an automobile body via hinges pivoting about an axis extending in a vertical direction. The door body 2 includes an inner panel (not shown) and an outer panel 2a which are made of a steel sheet or any other suitable material, and is configured to house a window glass 4 which is movable up and down, and a lifting apparatus (not shown) which allows the window glass 4 to move up and down.

Figure 4:
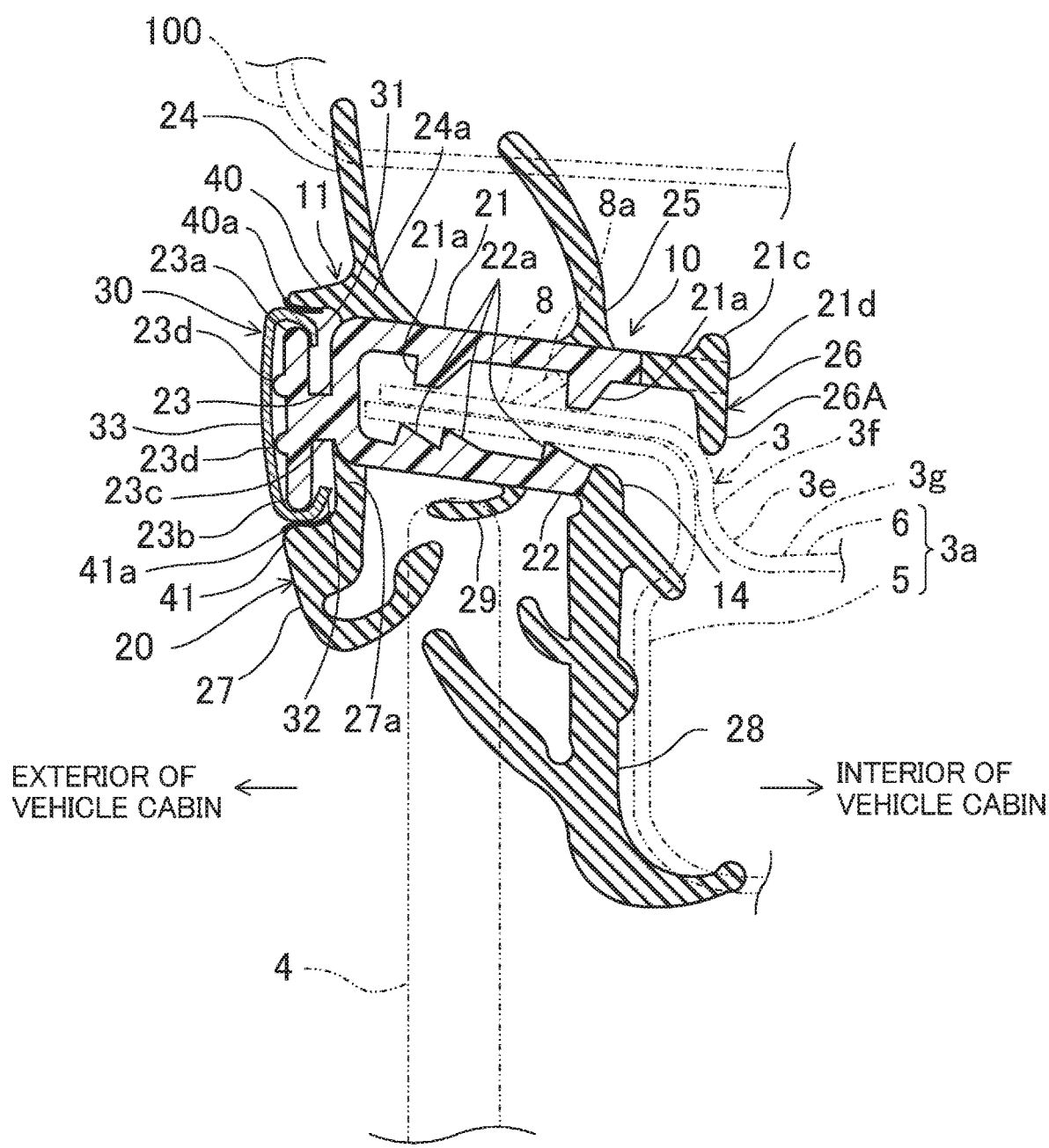
FIG. 4 is a cross-sectional view taken along line IV-IV in FIG. 3.
Figure 8:
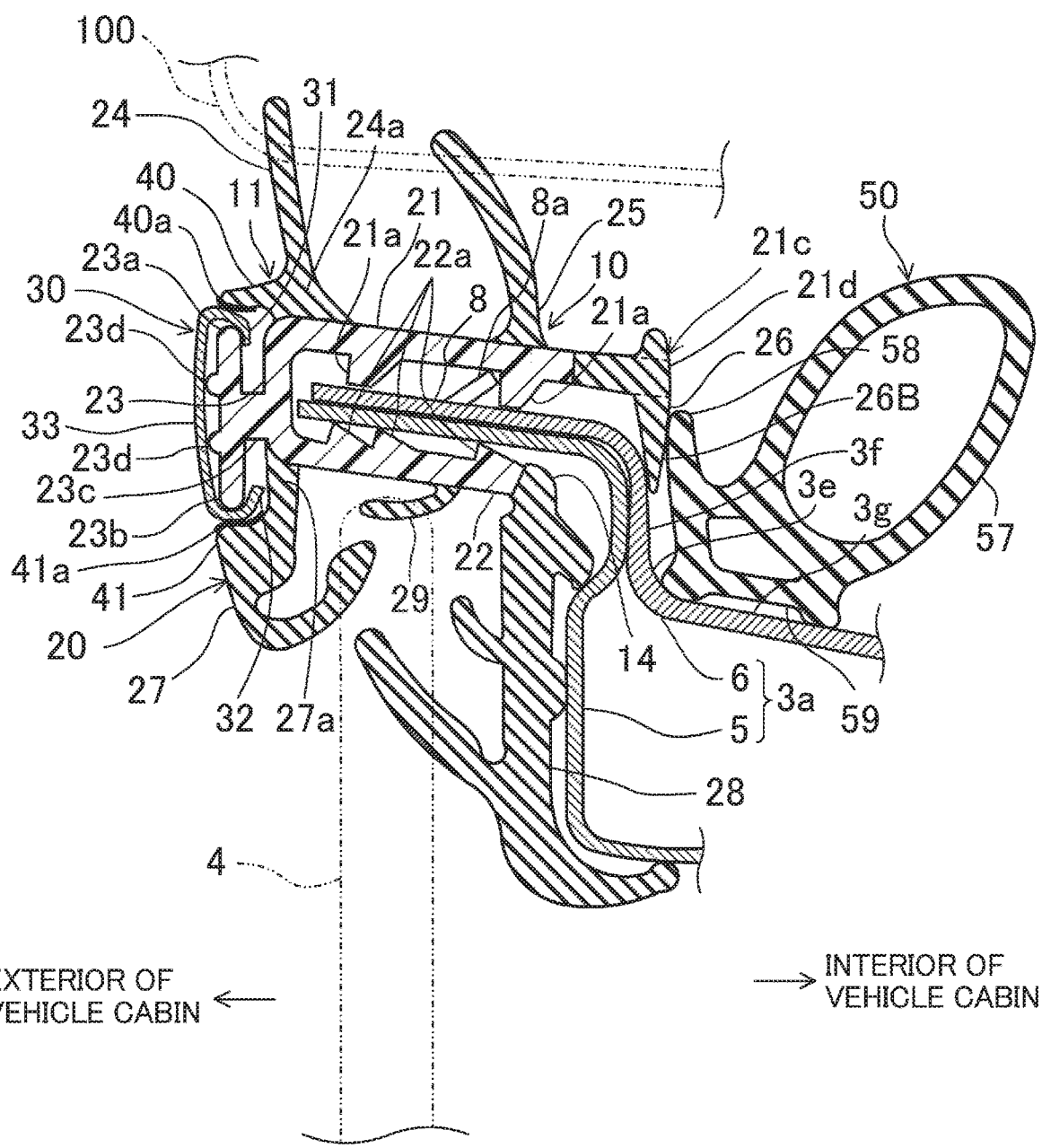
FIG. 8 is a cross-sectional view taken along line VIII-VIII in FIG. 2.

The window frame 3 functions as a sash holding a peripheral portion of the window glass 4, and extends to define a window opening 7. The window glass 4 is configured to cover or uncover the window opening 7 defined by the window frame 3. The window frame 3 of this embodiment is comprised of a combination of an outer panel 5 and an inner panel 6, both of which are press-formed from a steel sheet or any other suitable material, as shown in FIGS. 4 and 8. Note that the window frame 3 may be obtained by, for example, roll forming.

As illustrated in FIG. 1, the window frame 3 is comprised of an upper frame portion 3a and a rear frame portion 3b. The upper frame portion 3a extends rearward from a front part of an upper edge of the door body 2, and is curved such that the upper frame portion 3a extends upward toward the rear end of the door body 2. The rear frame portion 3b extends upward from a rear portion of the upper edge of the door body 2. An upper end of the rear frame portion 3b and a rear end of the upper frame portion 3a are connected together to form the window frame 3.

The shape of the window frame 3 is not limited to the illustrated one. Alternatively, the window frame 3 may be generally curved upward, and the position of a curved portion and a curvature of inclination angle of the upper frame portion 3a may be set in conformance to the roof shape of the vehicle body. The window frame 3 may include a front frame (not illustrated) vertically extending below the upper frame portion 3a. The front lower part of the upper frame portion 3a is provided with a door mirror mount 3d to which a door mirror (not illustrated) is attached.

As shown in FIG. 4, the upper frame portion 3a of the window frame 3 is provided with a plate-shaped, glass run mount 8 protruding toward the exterior of the cabin. The glass run mount 8 is comprised of exterior parts of the outer panel 5 and the inner panel 6. That is to say, the exterior part of the outer panel 5 extends substantially horizontally, and continuously extends in the front-rear direction. Likewise, the exterior part of the inner panel 6 extends substantially horizontally, and continuously extends in the front-rear direction. The lower surface of the exterior part of the inner panel 6 is placed on the upper surface of the exterior part of the outer panel 5 to form the glass run mount 8. The glass run mount 8 can be constituted by either one or both of the outer panel 5 and the inner panel 6.

The upper frame portion 3a includes a step part 3e located closer to the interior of the cabin than the glass run mount 8 is. The step part 3e has an exterior upper portion away from the cabin and an interior lower portion close to the cabin. The step part 3e includes a vertical surface 3f and a horizontal surface 3g. The vertical surface 3f extends in the vertical direction. The horizontal surface 3g extends inward from the lower end of the vertical surface 3f toward the cabin. At the center portion of the upper frame portion 3a in the front-rear direction, the vertical surface 3f extends in the front-rear direction with a substantially constant height and the horizontal surface 3g extends at a generally constant height level relative to the glass run mount 8. At the rear of the upper frame portion 3a, however, the height of the vertical surface 3f increases toward the rear end of the upper frame portion 3a. Accordingly, the horizontal surface 3g is positioned at a lower height level toward the rear end of the upper frame portion 3a relative to the glass run mount 8.

A garnish 9 made of, for example, a resin plate is attached on the exterior part of the rear frame portion 3b of the window frame 3. The garnish 9 extends vertically along the exterior surface of the rear frame portion 3b to cover the exterior surface. The upper end of the garnish 9 reaches the rear end of the upper frame portion 3a. The garnish 9 may be excluded.

Automobile Door Sealing Structure

The vehicle door sealing structure is mounted to the window frame 3 of the left front door 1, and includes at least a glass run 10 that provides a seal between the window frame 3 and the window glass 4, and a weather strip 50 mounted to the window frame 3 and located closer to the interior of the cabin than the glass run 10 is. Further, a third sealing member other than the glass run 10 and the weather strip 50 may be provided.

Structure of Automobile Door Glass Run 10

Figure 6:
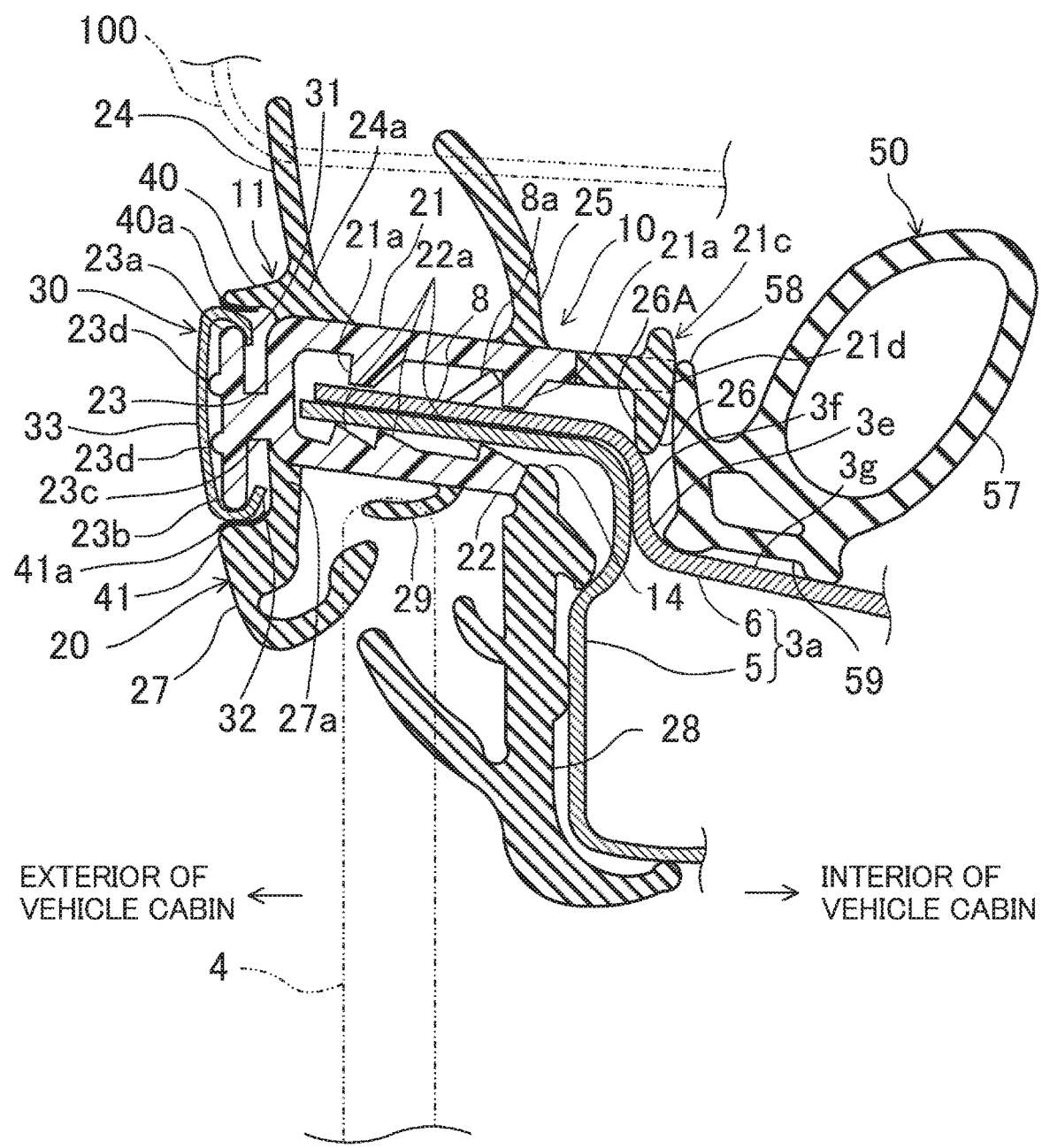
FIG. 6 is a cross-sectional view taken along line VI-VI in FIG. 2.

As illustrated in FIG. 6, a left front door glass run 10 is a so-called "hidden type" glass run which covers at least an exterior part of the window frame 3. As will be described in detail later, the left front door glass run 10 is assembled on the upper frame portion 3a from the exterior of the cabin, and functions as a seal which seals a gap between the window frame 3 and the window glass 4. The left front door glass run 10 further covers the glass run mount 8 that is the exterior part of the window frame 3.

As illustrated in FIG. 1, the left front door glass run 10 includes an upper glass run portion 11, a front vertical glass run portion 12, and a rear vertical glass run portion 13. The upper glass run portion 11, the front vertical glass run portion 12, and the rear vertical glass run portion 13 are integrally formed together. The upper glass run portion 11 extends in the front-rear direction along the upper frame portion 3a that is the upper part of the window frame 3, and is curved along the upper frame portion 3a in the state assembled on the glass run mount 8.

The front vertical glass run portion 12 extends downward from the front end of the upper glass run portion 11. The rear vertical glass run portion 13 extends downward from the rear end of the upper glass run portion 11. The front vertical glass run portion 12 and the rear vertical glass run portion 13 extend to the interior of the door body 2, and vertically guide the front part and the rear part of the window glass 4.

As illustrated in FIG. 4, the upper glass run portion 11 of the left front door glass run 10 includes a glass run body 20 and a trim strip 30. The glass run body 20 has an insertion groove 14 into which the glass run mount 8 of the upper frame portion 3a is inserted. The trim strip 30 is assembled on the exterior part of the glass run body 20 and extends in the front-rear direction. The trim strip 30 is assembled only on the glass run body 20 forming the upper glass run portion 11, and is not assembled on the front vertical glass run portion 12 or the rear vertical glass run portion 13. The trim strip 30 may be excluded from the upper glass run portion 11. In this case, for example, an upper body mating portion 23a and a lower body mating portion 23b, which are described later, may be excluded.

The glass run body 20 includes an upper plate portion 21, a lower plate portion 22, and an exterior plate portion 23 away from the cabin. The upper plate portion 21 extends along the upper surface of the glass run mount 8. The lower plate portion 22 extends along the lower surface of the glass run mount 8. The exterior plate portion 23 vertically extends from the exterior end, away from the cabin, of the upper plate portion 21 to the exterior end, away from the cabin, of the lower plate portion 22. The upper plate portion 21, the lower plate portion 22, and the exterior plate portion 23 are integrally formed together.

The insertion groove 14 in which the glass run mount 8 is inserted is formed between the upper plate portion 21 and the lower plate portion 22. The insertion groove 14 has an opening defined by the inner ends of the upper plate portion 21 and the lower plate portion 22, and extends in the front-rear direction. The exterior plate portion 23 constitutes a bottom of the insertion groove 14. With the glass run body 20 mounted on the glass run mount 8, the depth of the insertion groove 14 and the dimension (dimension in the lateral direction) of the glass run mount 8 in an inward-outward direction of the cabin are determined such that the exterior end of the glass run mount 8 reaches near the bottom of the insertion groove 14.

The upper plate portion 21, the lower plate portion 22, and the exterior plate portion 23 are formed of a high-stiffness material having a flexural constant ranging from 2000 MPa to 5000 MPa. Examples of such a high-stiffness material include hard resin (such as polypropylene with talc or glass fiber mixed), but is not limited thereto. Instead of hard resin, other materials and various composite materials are also applicable. Use of the above-described high-stiffness material for the upper plate portion 21, the lower plate portion 22, and the exterior plate portion 23 can increase the stiffness of the upper plate portion 21, the lower plate portion 22, and the exterior plate portion 23, and particularly prevent a wide separation between the upper plate portion 21 and the lower plate portion 22. This structure allows the upper plate portion 21 and the lower plate portion 22 to firmly holding the glass run mount 8 in the thickness direction with the glass run body 20 mounted on the glass run mount 8. This can substantially prevent the left front door glass run 10 from being accidentally detached from the glass run mount 8 and sufficiently increase the anchoring strength of the left front door glass run 10.

The lower surface of the upper plate portion 21 has a plurality of upper engaging projections 21a projecting downward and formed at certain intervals in the inward-outward direction of the cabin. The upper engaging projection 21a can be designed so as to have its lower end be in contact with the upper surface of the glass run mount 8. The upper engaging projection 21a located closer to the interior of the cabin abuts on, and engages with, a raised portion 8a, which projects upward from the upper surface of the glass run mount 8, from the exterior of the cabin. As a result, the left front door glass run 10 becomes less likely to be detached from the glass run mount 8.

The upper surface of the lower plate portion 22 has a plurality of lower engaging projections 22a projecting upward and formed at certain intervals in the inward-outward direction of the cabin. The lower engaging projection 22a can be designed so as to have its upper end be in contact with the lower surface of the glass run mount 8. The vertical distance between the upper end of the lower engaging projection 22a and the lower end of the upper engaging projection 21a may be as large as the thickness of the glass run mount 8 or may be slightly larger than the thickness of the glass run mount 8 for easier assembly.

The glass run body 20 is provided with an upper sealing lip 24 at an upper part of its exterior part. The upper sealing lip 24 projects upward and is designed to be bent toward the exterior of the cabin, upon contact with a vehicle body 100. A base end of the upper sealing lip 24 is fixed to, and is integrated with, an exterior part of the upper surface of the upper plate portion 21. When the upper sealing lip 24 is not in contact with the vehicle body 100, i.e., when the left front door 1 is open, the upper sealing lip 24 is projecting substantially straight upward as illustrated in FIG. 4. When the upper sealing lip 24 is in contact with the vehicle body 100, i.e., when the left front door 1 is closed, although not illustrated, the upper sealing lip 24 is pushed outward and obliquely downward from the cabin by the vehicle body 100, and is elastically deformed to have its top end be positioned farther from the cabin than the base end is, and closely contacts the vehicle body 100. This structure provides the upper sealing lip 24 with sealing properties. Examples of the vehicle body 100 include a body panel.

The glass run body 20 is provided with an interior sealing lip 25 at an upper part of its interior part. The interior sealing lip 25 projects obliquely upward to the exterior of the cabin, and is designed to be bent toward the exterior of the cabin, upon contact with the vehicle body 100. A base end of the interior sealing lip 25 is fixed to, and is integrated with, an interior part of the upper surface of the upper plate portion 21. When the interior sealing lip 25 is not in contact with the vehicle body 100, i.e., when the left front door 1 is open, the interior sealing lip 25 projects outward and obliquely upward from the cabin as illustrated in FIG. 4. When the interior sealing lip 25 is in contact with the vehicle body 100, i.e., when the left front door 1 is closed, although not illustrated, the interior sealing lip 25 is pushed outward and obliquely downward from the cabin by the vehicle body 100, and is elastically deformed to be close to the base end of the upper sealing lip 24, and closely contacts the vehicle body 100. This structure provides the interior sealing lip 25 with sealing properties.

The glass run body is provided with a door panel sealing lip 26 at a position closer to the cabin. The door panel sealing lip 26 protrudes downward from the interior end of the upper plate portion 21 to contact the upper frame portion 3a, and extends in the front-rear direction. The door panel sealing lip 26 is fixed to, and is integrated with, an interior end of the upper plate portion 21. The door panel sealing lip 26 will be described in more detail below. In addition, a raised portion 21c protruding upward is formed at the interior end of the upper plate portion 21.

The glass run body 20 further has, at a lower part of its exterior part, a lower sealing portion 27 projecting downward. A base end of the lower sealing portion 27 is fixed to, and is integrated with, an exterior part of the lower surface of the lower plate portion 22. The lower sealing portion 27 further has a lower portion bending toward the interior of the cabin. The lower part of the lower sealing portion 27 contacts the exterior surface of the closed window glass 4.

The glass run body 20 further has, at a lower part of its interior part, a lower sealing portion 28 projecting downward. The lower sealing portion 28 has its base end fixed to, and integrated with, an interior end surface of the lower plate portion 22. The lower sealing portion 28 further has a lower portion bending toward the interior of the cabin. The lower portion of the lower sealing portion 28 contacts the outer panel 5 of the window frame 3. The lower sealing portion 28 further contacts an interior surface of the closed window glass 4.

The lower plate portion 22 has, on its lower surface, a middle sealing lip 29 located between the base end of the lower sealing portion 27 and the base end of the lower sealing portion 28. The middle sealing lip 29 has a base end fixed to, and integrated with, a middle portion of the lower surface of the lower plate portion 22 in the inward-outward direction of the cabin. The middle sealing lip 29 extends outward and obliquely downward from the cabin and contacts an upper end of the closed window glass 4.

The upper sealing lip 24, the interior sealing lip 25, the door panel sealing lip 26, the lower sealing portion 27, the lower sealing portion 28, and the middle sealing lip 29 are integrated with members (the upper plate portion 21, the lower plate portion 22, and the exterior plate portion 23) formed of the above-described high-stiffness material. This structure ensures maintainability of the shapes in assembly even if they are formed of a material softer than the high-stiffness material and thus easy to be elastically deformed. For example, the upper sealing lip 24, the interior sealing lip 25, the door panel sealing lip 26, the lower sealing portion 27, the lower sealing portion 28, and the middle sealing lip 29 may be formed from an elastic material such as ethylene-propylene-diene rubber (EPDM) and thermoplastic olefin elastomer (TPO). The EPDM or TPO may be in a foamed state, or in a solid state with no bubbles. TPO is more preferable for use if hard resin such as polypropylene is used for the above-described high-stiffness material.

The upper sealing lip 24, the interior sealing lip 25, the door panel sealing lip 26, the lower sealing portion 27, the lower sealing portion 28, and the middle sealing lip 29 form the glass run body 20 together with the upper plate portion 21, the lower plate portion 22, and the exterior plate portion 23.

Figure 2:
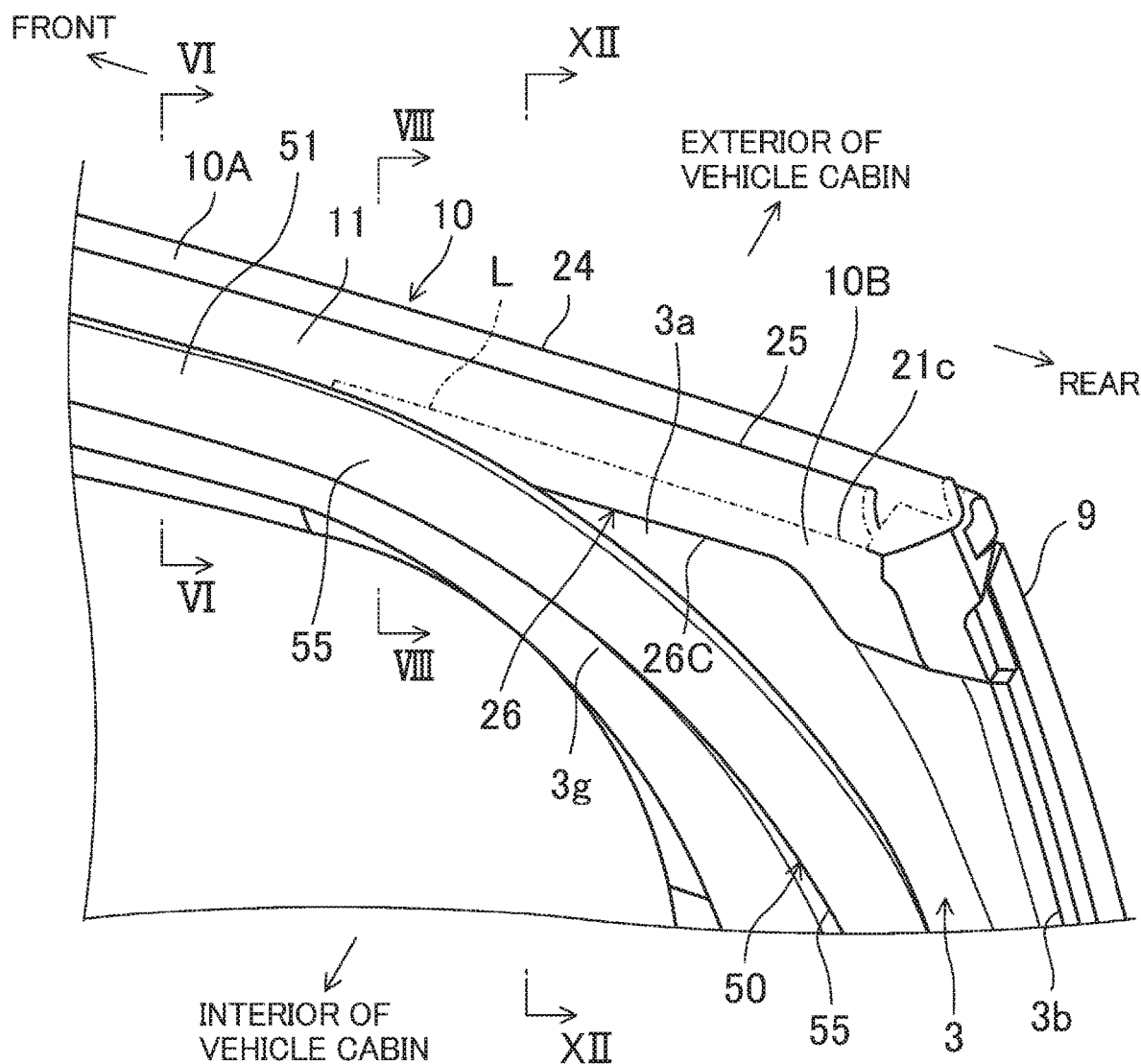
FIG. 2 is a perspective view of an upper, inner rear part of a window frame of the automobile door close to a vehicle cabin seen from diagonally above.
Figure 3:
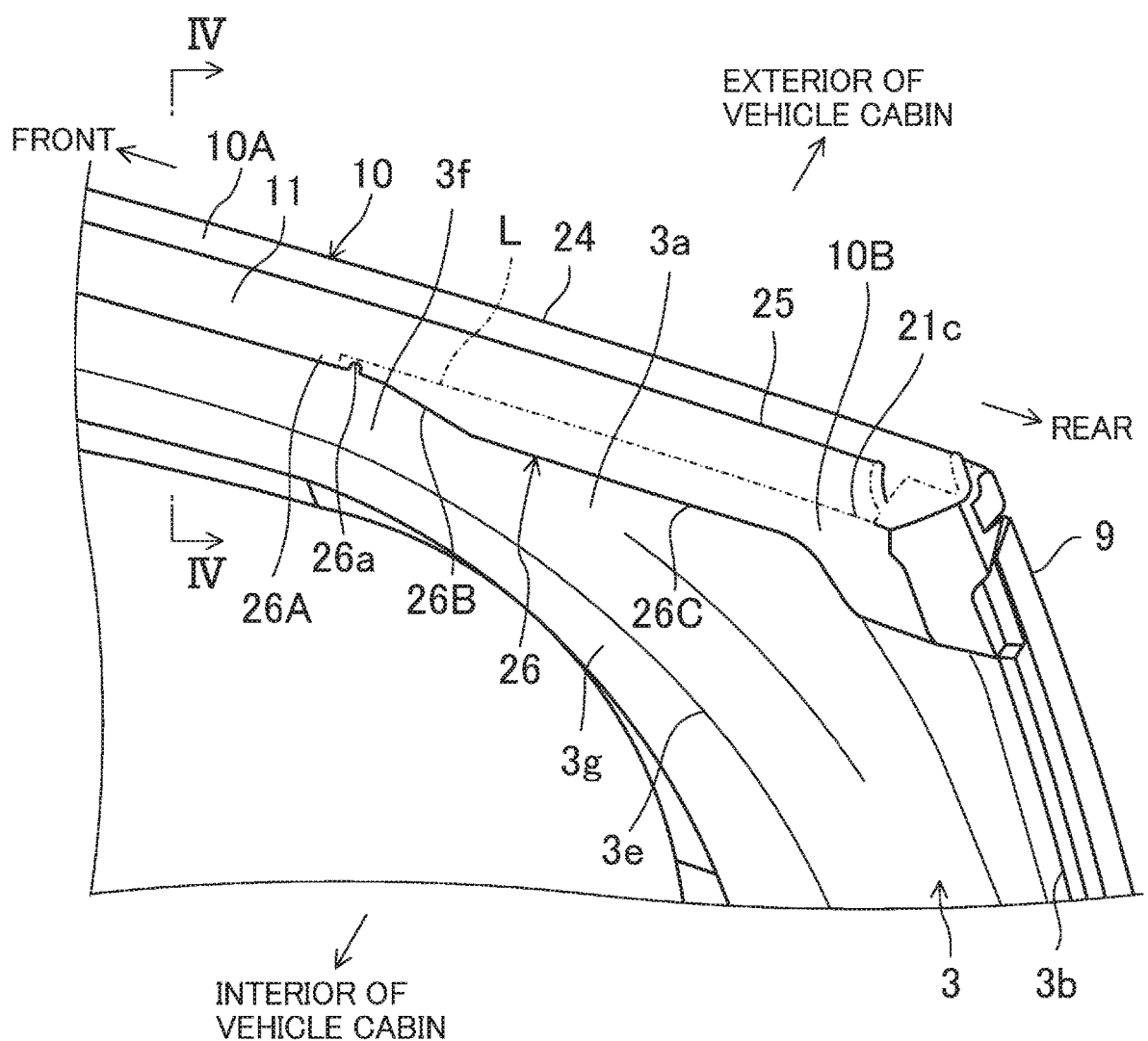
FIG. 3 is a view corresponding to FIG. 2 from which a weather strip is removed.

As illustrated in FIGS. 2 and 3, the center portion of the upper glass run portion 11 in the front-rear direction is formed by extrusion and is referred to as an extrusion-molded portion 10A. The entire cross-sectional shape in FIG. 4, which is a cross-sectional view taken along line IV-IV in FIG. 2, is formed by the extrusion-molded portion 10A.

The extrusion-molded portion 10A is formed by a known extrusion method to have a uniform cross-section in the front-rear direction. For example, a material is formed into a long shape by an extrusion method, and is cut to a required length to obtain the extrusion-molded portion 10A.

A portion of the upper glass run portion 11 at a position, closer to the rear end than the extrusion-molded portion 10A is, has a die-molded portion 10B molded using an openable molding die (not illustrated). The die-molded portion 10B is formed by a molding die device including, for example, an upper die and a lower die, and including a molding die drive mechanism that moves one of the dies to and away from the other die. The die-molded portion 10B is not formed in a uniform cross section, although it will be described later in detail.

The boundary between the extrusion-molded portion 10A and the die-molded portion 10B is indicated by a dash-dot line L in FIGS. 2, 3, 5, and 7. The center portion of the door panel sealing lip 26 in the front-rear direction is configured as the extrusion-molded portion 10A. A portion of the door panel sealing lip 26 at a position closer to the rear end is configured as a die-molded portion 10B. Such a structure can be formed by various methods. One example is that, first, a long extrusion-molded portion 10A including the shape of the door panel sealing lip 26 is formed, and then, a portion, corresponding to the door panel sealing lip 26, of the rear of the extrusion-molded portion 10A is cut off and a die-molded portion 10B is integrally formed with the rear of the extrusion-molded portion 10A. With this process, the door panel sealing lip 26 that is the extrusion-molded portion 10A and the door panel sealing lip 26 that is the die-molded portion 10B can be integrated to have a continuous shape.

The trim strip 30 illustrated in FIG. 1 is a member included for vehicle design purposes, and typically made of hard material such as stainless steel or aluminum. In this embodiment, the trim strip 30 is formed of a stainless plate member. The trim strip 30 has an elongated shape extending in the front-rear direction along the glass run body 20. The trim strip 30 has its front end located near the front end of the upper frame portion 3a of the window frame 3 and has its rear end located near the rear end of the upper frame portion 3a of the window frame 3.

As illustrated in FIG. 4, the trim strip 30 has, at its upper and lower parts, upper and lower mating portions 31 and 32 (hereinafter referred to as "upper and lower trim strip mating portions 31 and 32") mating with the exterior part of the glass run body 20 and extending in the front-rear direction. The upper trim strip mating portion 31 is folded toward the interior of the cabin and is bent downward, and is open downward. The lower trim strip mating portion 32 is folded toward the interior of the cabin and is bent upward, and is open upward. The trim strip 30 further has a design portion 33 between the upper and lower trim strip mating portions 31 and 32. The design portion 33 is gently curved toward the exterior of the cabin.

The glass run body 20 has, at its exterior part, upper and lower mating portions 23a and 23b (hereinafter referred to as "upper and lower body mating portions 23a and 23b") extending in the front-rear direction and configured to respectively mate with the upper and lower trim strip mating portions 31 and 32. That is to say, the exterior plate portion 23 of the glass run body 20 has, at its exterior surface, a base portion 23c extending toward the exterior of the cabin. The base portion 23c is located near the vertical middle portion of the exterior surface of the exterior plate portion 23, and is continuous in the front-rear direction.

The upper and lower body mating portions 23a and 23b continuously extend from the front end to the rear end of the glass run body 20, and are formed in the shape of a rail to guide a trim strip 30, which will be described later, in the front-rear direction in assembling the trim strip 30.

As illustrated in FIG. 4, the upper trim strip mating portion 31 of the trim strip 30 is designed to surround the upper body mating portion 23a of the glass run body 20 from above and to mate with the upper body mating portion 23a in this state. The lower trim strip mating portion 32 of the trim strip 30 is designed to surround the lower body mating portion 23b of the glass run body 20 from below and to mate with the lower body mating portion 23b in this state. When the upper and lower trim strip mating portions 31 and 32 respectively mate with the upper and lower body mating portions 23a and 23b, the shapes of the upper and lower trim strip mating portions 31 and 32 function to substantially prevent displacement of the trim strip 30 from the glass run body 20 in the inward-outward direction of the cabin and the vertical direction of the cabin.

In this embodiment, the upper and lower body mating portions 23a and 23b are integrally formed with the exterior plate portion 23. This allows the upper body mating portion 23a and the lower body mating portion 23b to be formed of the high-stiffness material. This structure can reduce accidental detachment of the trim strip 30 from the glass run body 20 with the upper and lower trim strip mating portions 31 and 32 respectively mating with the upper and lower body mating portions 23a and 23b.

The glass run body 20 has, at its exterior part, an upper contacting portion 40 formed of an elastic material and configured to contact an upper part of the exterior surface of the trim strip 30. The upper contacting portion 40 projects outward from an exterior surface of a base end of the upper sealing lip 24. The upper contacting portion 40 and the upper sealing lip 24 are integrally formed together. The upper contacting portion 40 is tapered toward its front end (the exterior of the cabin) in the projecting direction, and continuously extends in the front-rear direction. The lower surface of the front end of the upper contacting portion 40 contacts the trim strip 30 from above, eliminating a gap between the upper part of the trim strip 30 and the upper part of the glass run body 20 to improve the appearance.

Furthermore, the upper contacting portion 40 and the upper sealing lip 24 are integrally formed together through a thick base end 24a. Upon elastic deformation of the upper sealing lip 24 in the outward direction of the cabin, the upper contacting portion 40 is therefore slightly displaced on the basis of the amount and the direction of deformation of the upper sealing lip 24. For example, as described above, the upper sealing lip 24 projects substantially straight upward when the left front door 1 is open. In this state, the position and the shape of the upper contacting portion 40 are determined such that the lower surface of the front end of the upper contacting portion 40 contacts the trim strip 30 from above. When the left front door 1 is closed, the upper sealing lip 24 is elastically deformed so as to be inclined outward and obliquely downward from the cabin. This deformation makes the upper contacting portion 40 slightly displaced outward and downward from the cabin through the thick base end 24a. The lower surface of the front end of the upper contacting portion 40 accordingly touches the trim strip 30 slightly harder from above, allowing the upper contacting portion 40 and the trim strip 30 to further closely contact each other.

The glass run body 20 has, at its exterior part, a lower contacting portion 41 located below and apart from the upper contacting portion 40. The lower contacting portion 41 is formed of an elastic material, and is designed to contact the lower part of the exterior surface of the trim strip 30. The lower contacting portion 41 bulges outward from the exterior surface of the lower sealing portion 27, and is integrally formed with the lower sealing portion 27. The lower contacting portion 41 continuously extends in the front-rear direction. The lower contacting portion 41 contacts the trim strip 30 from below, eliminating a gap between the lower part of the trim strip 30 and the lower part of the glass run body 20 to improve the appearance.

The lower contacting portion 41 and the lower sealing portion 27 are integrally formed together, and both extend downward from a base end 27a. Upon elastic deformation of the lower sealing portion 27, the lower contacting portion 41 is therefore displaced on the basis of the amount and the direction of deformation of the lower sealing portion 27. For example, as described above, when the window glass 4 is closed, the lower sealing portion 27 contacts the exterior surface of the window glass 4, and may be elastically deformed toward the exterior of the cabin. The lower contacting portion 41 is accordingly displaced toward the exterior of the cabin, and touches the trim strip 30 hard from below, ensuring firm contact between the lower contacting portion 41 and the trim strip 30.

The glass run body 20 further has, at its exterior part, projections 23d projecting outward from the cabin and configured to contact an interior surface of the trim strip 30. The projection 23d contacts the interior surface of the trim strip 30, substantially preventing a wider area of the exterior plate portion 23 from contacting the trim strip 30. The projection 23d can be integrally formed with the exterior plate portion 23.

Coating for Reducing Sliding Resistance

In this embodiment, the trim strip 30 is assembled on the glass run body 20 by sliding the trim strip 30 along the glass run body 20 from an end in the longitudinal direction. This structure can reduce the sliding resistance of the trim strip 30 in the assembly operation, and allows manual assembly of the trim strip 30 by a worker.

That is to say, the upper contacting portion 40 has a portion contacting the trim strip 30, and the portion is provided with an elastic upper coating 40a. The upper coating 40a has a sliding resistance to the trim strip 30 lower than an elastic material forming a covered portion of the upper contacting portion 40 by the upper coating 40a. More specifically, the covered portion of the upper contacting portion 40 by the upper coating 40a is formed of a similar elastic material to the upper sealing lip 24 and others, whereas the upper coating 40a is formed from a material fabricated by mixing silicone with olefin series resin and therefore having a kinetic friction coefficient lower than the similar elastic material to the upper sealing lip 24 and others. The upper coating 40a may be formed from another material other than the material fabricated by mixing silicone with olefin series resin.

The kinetic friction coefficient of the upper coating 40a is preferably 0.5 or less. The kinetic friction coefficient of the upper coating 40a can be changed as necessity by adjusting the amount of mixed silicone. The elastic material forming the covered portion of the upper contacting portion 40 by the upper coating 40a has a kinetic friction coefficient of about 0.6.

A method for measuring a kinetic friction coefficient will now be described. The method for measuring a kinetic friction coefficient described in Japanese Unexamined Patent Publication No. H09-123761 is applicable in this case, and the above-described kinetic friction coefficients are values obtained using this method. "HEIDON-14D" of SHINTO Scientific Co., ltd. was prepared as a surface texture measuring instrument, and the kinetic friction coefficients were measured using a sheet-metal shaped like watch glass. As illustrated in FIG. 3 of Japanese Unexamined Patent Publication No. H09-123761, a kinetic friction coefficient is measured by pressing the sheet-metal shaped like watch glass against the upper surface of a sample at a load of 1 kgf and relatively moving the sheet-metal shaped like watch glass and the sample at a speed of 1000 mm/min.

The upper coating 40a is set to have a thickness ranging from 0.1 mm to 1.0 mm. The thickness of the upper coating 40a of equal to or more than 0.1 mm can sufficiently reduce the sliding resistance to the trim strip 30. The thickness of the upper coating 40a of equal to or less than 1.0 mm can reduce a decrease in flexibility of the upper contacting portion 40 due to the presence of the upper coating 40a.

The lower contacting portion 41 has a portion contacting the trim strip 30, and the portion is provided with a lower coating 41a. The lower coating 41a has a kinetic friction coefficient to the trim strip 30 lower than an elastic material forming a covered portion of the lower contacting portion 41 by the lower coating 41a. The lower coating 41a can be formed from the same material as the material used for the upper coating 40a, and have the same thickness as the upper coating 40a. The upper coating 40a and the lower coating 41a may be omitted.

Method for Assembling Automobile Door Glass Run

The left front door glass run 10 configured as above is assembled by the following method. A portion (the upper glass run portion 11) of the glass run body 20 designed to extend along the upper frame portion 3a is originally linear before the glass run body 20 is mounted on the window frame 3. The trim strip 30 is preliminarily curvedly formed to fit along the upper frame portion 3a of the window frame 3.

In the sliding assembly process, the glass run body 20 is assembled by respectively mating one ends of the upper and lower body mating portions 23a and 23b of the glass run body 20 in the longitudinal direction with one ends of the upper and lower trim strip mating portions 31 and 32 of the trim strip 30 in the longitudinal direction, and then, sliding the glass run body 20 along the trim strip 30 in the longitudinal direction.

In the sliding assembly process, first, rear ends of the upper and lower body mating portions 23a and 23b of the glass run body 20 are allowed to respectively mate with front ends of the upper and lower trim strip mating portions 31 and 32 of the trim strip 30. After the upper and lower body mating portions 23a and 23b respectively mate with the upper and lower trim strip mating portions 31 and 32, the glass run body 20 is slid along the trim strip 30 toward the rear side. As described above, in sliding, because the trim strip 30 is curved whereas the upper glass run portion 11 of the glass run body 20 is linear, the upper contacting portion 40 of the sliding glass run body 20 particularly tightly contacts the upper trim strip mating portion 31 of the trim strip 30. In addition, the lower contacting portion 41 of the glass run body 20 may contact the lower trim strip mating portion 32 of the trim strip 30.

In this step, the upper contacting portion 40 has the portion contacting the trim strip 30, and the portion is covered by the upper coating 40a having a lower kinetic friction coefficient to the trim strip 30 than the upper contacting portion 40. This reduces the sliding resistance between the upper part of the trim strip 30 and the upper contacting portion 40. Likewise, the lower contacting portion 41 has the portion contacting the trim strip 30, and the portion is covered by the lower coating 41a having a lower kinetic friction coefficient to the trim strip 30 than the lower contacting portion 41. This reduces the sliding resistance between the lower part of the trim strip 30 and the lower contacting portion 41. This structure facilitates manual assembly of the glass run body 20 on the trim strip 30 by a worker and thus makes it unnecessary to introduce any machine for trim strip assembly. The sliding operation ends when the front end of the upper glass run portion 11 of the glass run body 20 reaches the front end of the trim strip 30. In this manner, the glass run body 20 is assembled on the trim strip 30, thereby completing assembly operation of the left front door glass run 10.

With the trim strip 30 curved upward, the upper part of the trim strip 30 tightly contacts the glass run body 20 compared to the lower part of the trim strip 30. Because of this structure, the glass run body 20 only has to include the upper coating 40a and may exclude the lower coating 41a.

In the sliding assembly process, the glass run body 20 is slid along the trim strip 30. Conversely, the trim strip 30 may be slid along the glass run body 20.

For Use of Automobile Door Glass Run

For mounting the left front door glass run 10 to the left front door 1, the left front door glass run 10 is mounted on the glass run mount 8 of the window frame 3 with the upper engaging projections 21a of the upper plate portion 21 and the lower engaging projections 22a of the lower plate portion 22 respectively contacting the upper surface and the lower surface of the glass run mount 8. In this state with the left front door glass run 10 mounted, the upper plate portion 21, the lower plate portion 22, and the exterior plate portion 23 each have a flexural modulus ranging from 2000 MPa to 5000 MPa. This structure can increase the anchoring strength of the glass run body 20 to the glass run mount 8.

Thereafter, when the left front door 1 is closed, the upper sealing lip 24 and the interior sealing lip 25 of the glass run body 20 contact the vehicle body 100 and are elastically deformed so as to bend toward the exterior of the cabin, thereby sealing between the window frame 3 and the vehicle body 100. Upon deformation by bending of the upper sealing lip 24, the upper contacting portion 40, which is provided to the exterior part of the thick base end 24*a* of the upper sealing lip 24, is slightly displaced toward the exterior of the cabin, and further closely contacts the upper part of the exterior surface of the trim strip 30. This structure can eliminate a gap between the upper contacting portion 40 and the trim strip 30 to improve the appearance.

Structure of Weather Strip

Described next is the weather strip 50. As illustrated in, e.g., FIGS. 2, 7, and 8, the weather strip 50 is mounted to the horizontal surface 3*g* that is the lower portion of the step part 3*e* in the upper frame portion 3*a*. The weather strip 50 includes an upper weather strip 51 extending along the upper frame portion 3*a* in the front-rear direction of the vehicle, and a rear weather strip 52 extending downward from the rear end of the upper weather strip 51. As illustrated in FIG. 8, the weather strip 50 further includes a front weather strip 53 extending downward from the front end of the upper weather strip 51, and a lower weather strip 54 extending from the lower end of the rear weather strip 52 to the lower end of the front weather strip 53. The weather strip 50 has an annular shape extending along the peripheral portion of the left front door 1 at a position closer to the cabin.

The weather strip 50 includes a weather strip rear corner 55 at which the upper weather strip 51 and the rear weather strip 52 are connected. The weather strip rear corner 55 is mounted to a rear curved portion of the window frame 3. The weather strip 50 includes a weather strip front corner 56 at which the upper weather strip 51 and the front weather strip 53 are connected. The weather strip front corner 56 is mounted to a front curved portion of the window frame 3. Certain types of vehicles include a sharp-edged front corner or rear corner at which frames abut, not a window frame 3 with generally curved corners. However, many vehicles with a hidden-type structure typically include a window frame 3 with generally curved corners. In this regard, the weather strip 50 for the hidden-type structure is typically formed by extrusion for almost all around the annular shape to have an extruded cross-section, and has only one connecting portion L (for example, in the lower weather strip 54) at which ends of the weather strip 50 are connected to make the weather strip 50 an endless annular shape.

Figure 7:
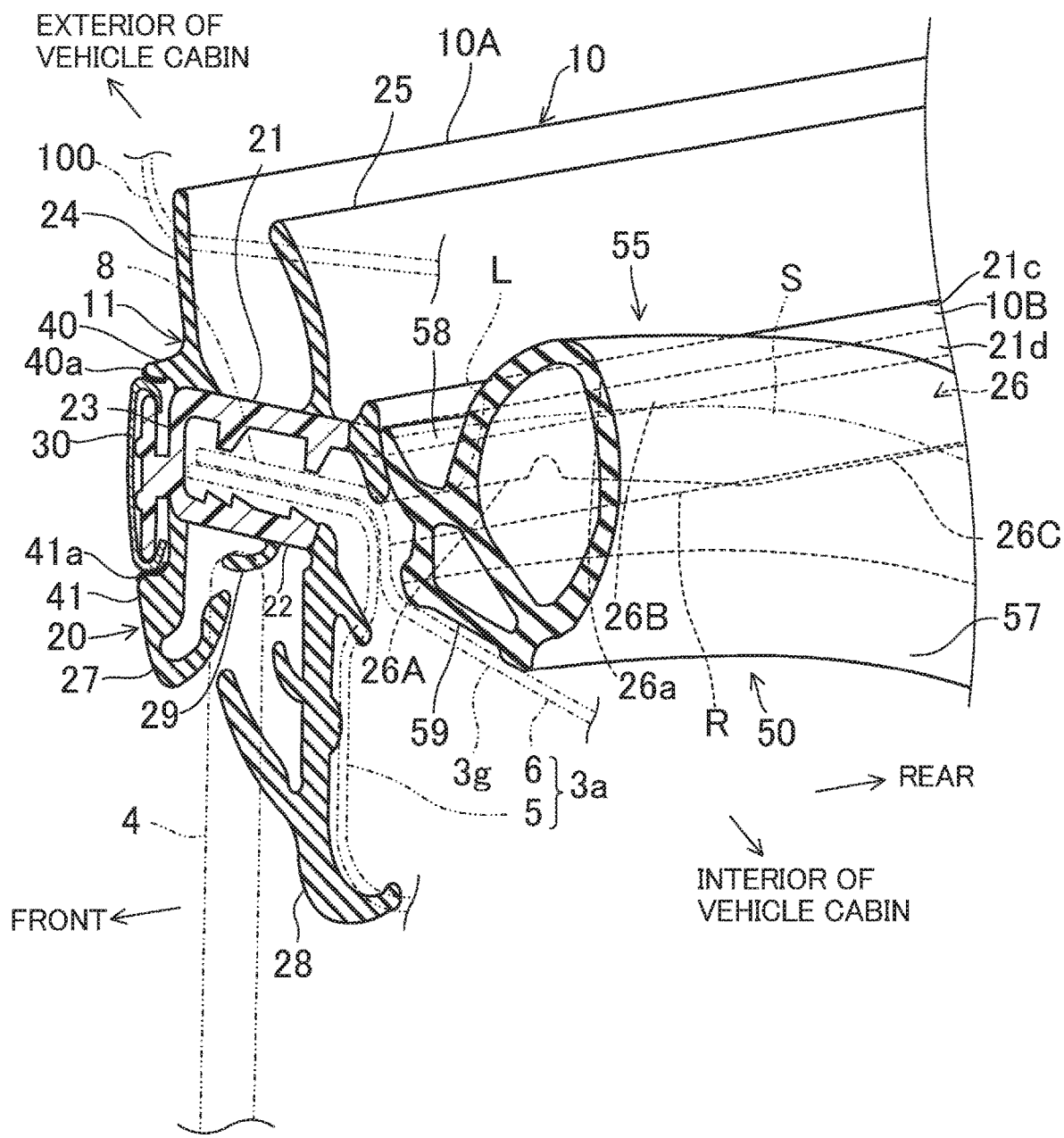
FIG. 7 is a perspective view of the upper glass run and an upper weather strip taken along line VI-VI in FIG. 2 seen from the interior of the vehicle cabin.

As illustrated in FIGS. 6 and 7, the upper weather strip 51 includes a hollow seal part 57, an outer sealing lip 58, and a plate-shaped mount 59. The hollow seal part 57, the outer sealing lip 58, and the mount 59 are integrally formed together, and can be formed by extrusion with, for example, the same elastic material as that of the door panel sealing lip 26. In many cases, the entire weather strip 50 is made of a foam material for greater water tightness.

The mount 59 is mounted to the horizontal surface 3*g* of the step part 3*e* in the upper frame portion 3*a* and extends along the horizontal surface 3*g*. The mount 59 can be mounted to the horizontal surface 3*g* by using, for example, clips or a double-sided adhesive tape, which are not illustrated. When clips are used, heads of the clips may be inserted into preformed mounting holes on the horizontal surface 3*g* through the mount 59 and fitted with the perimeter of the mounting holes. When a double-sided adhesive tape is used, an adhesive surface of the double-sided adhesive tape is bonded to the mount 59, and then the other adhesive surface is bonded to the horizontal surface 3*g*. The double-sided adhesive tape may be first bonded to the horizontal surface 3*g*.

The hollow seal part 57 is raised upward from the mount 59 and inward toward the cabin. When the left front door 1 is closed, the hollow seal part 57 is located between the upper frame portion 3*a* and the vehicle body 100 and is compressed and elastically deformed by the vehicle body 100. The hollow seal part 57 is tightly in contact with the vehicle body 100 and can provide a seal.

The outer sealing lip 58 protrudes upward from the exterior part of the hollow seal part 57 to contact an interior end surface of the upper plate portion 21 or the interior surface of the door panel sealing lip 26 of the glass run 10. The outer sealing lip 58 is thinner toward the upper end.

Figure 9:
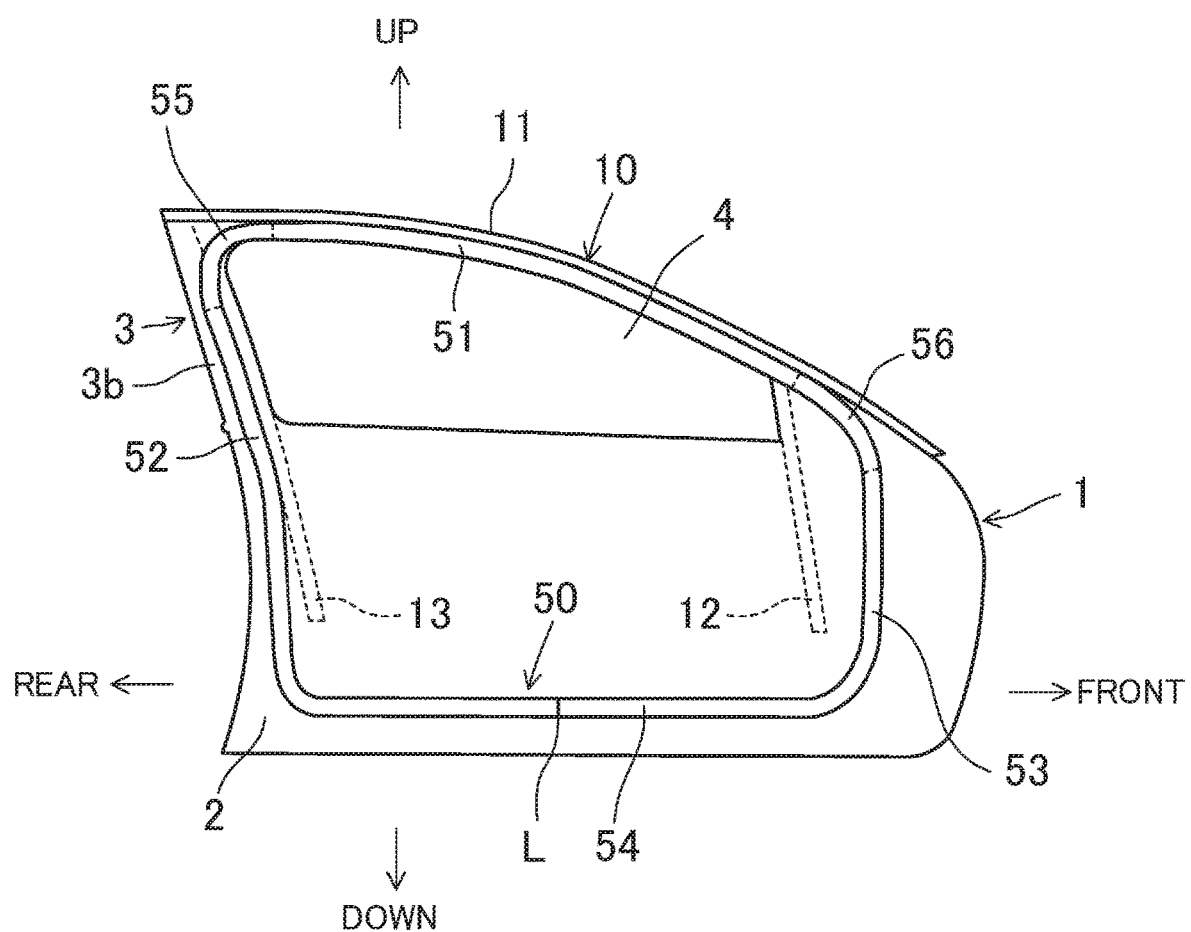
FIG. 9 is a right side view (seen from an interior of the vehicle) of the automobile door including an automobile door sealing structure according to an embodiment of the present disclosure.

Since the upper weather strip 51 is mounted to the horizontal surface 3*g* of the step part 3*e* in the upper frame portion 3*a*, the upper weather strip 51 is formed in conformance to the shape of the horizontal surface 3*g*. In other words, the center portion of the upper weather strip 51 in the front-rear direction extends linearly in the front-rear direction, and the upper weather strip 51 is located generally downward toward the rear end as illustrated in FIG. 9 as the height of the vertical surface 3*f* of the window frame 3 gradually increases toward the rear end. The center portion of the upper glass run portion 11 in the front-rear direction extends linearly in the front-rear direction and extends further to the rear end at substantially the same height position.

Figure 10:
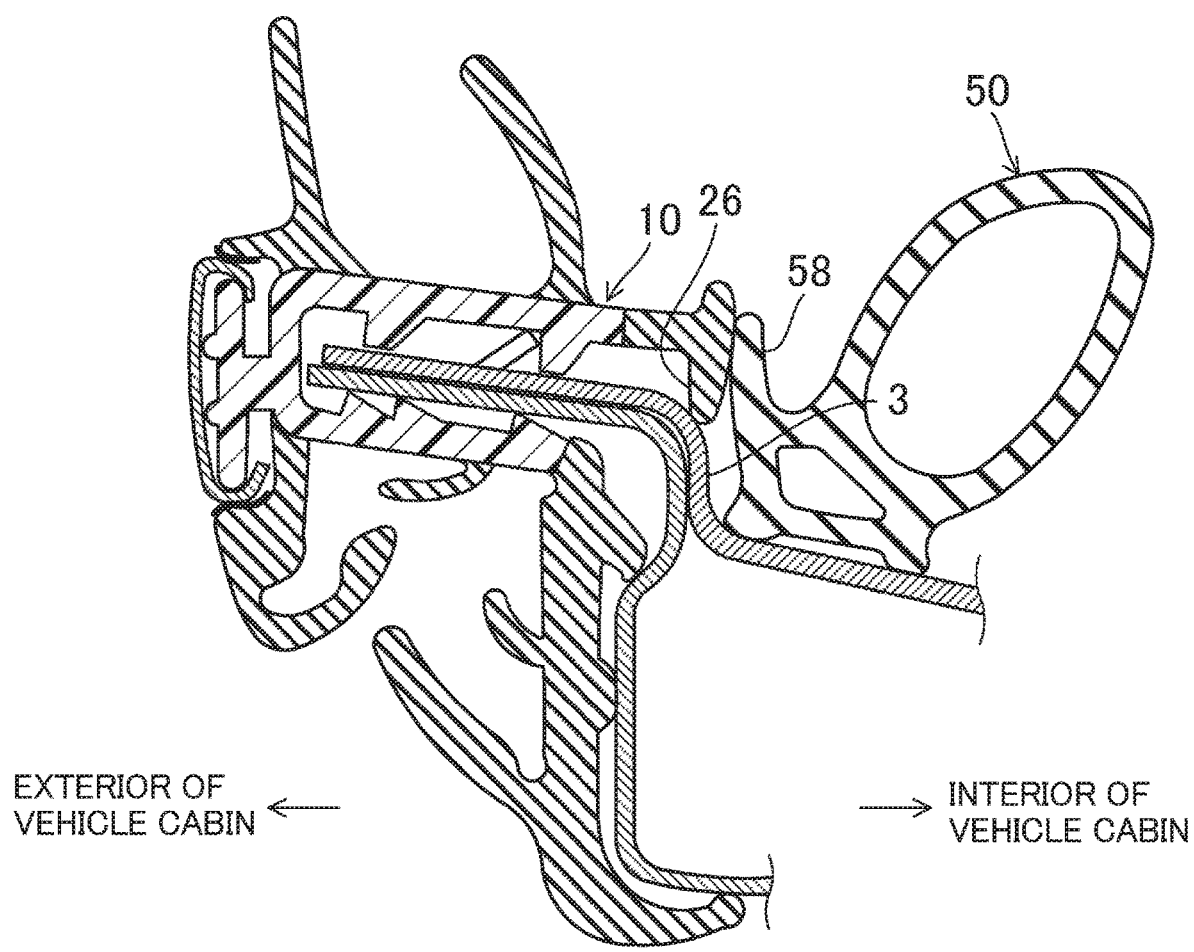
FIG. 10 is a cross-sectional view taken along line VI-VI in FIG. 2, and illustrates a positional relation between center portions of the glass run and the weather strip in a front-rear direction.
Figure 11:
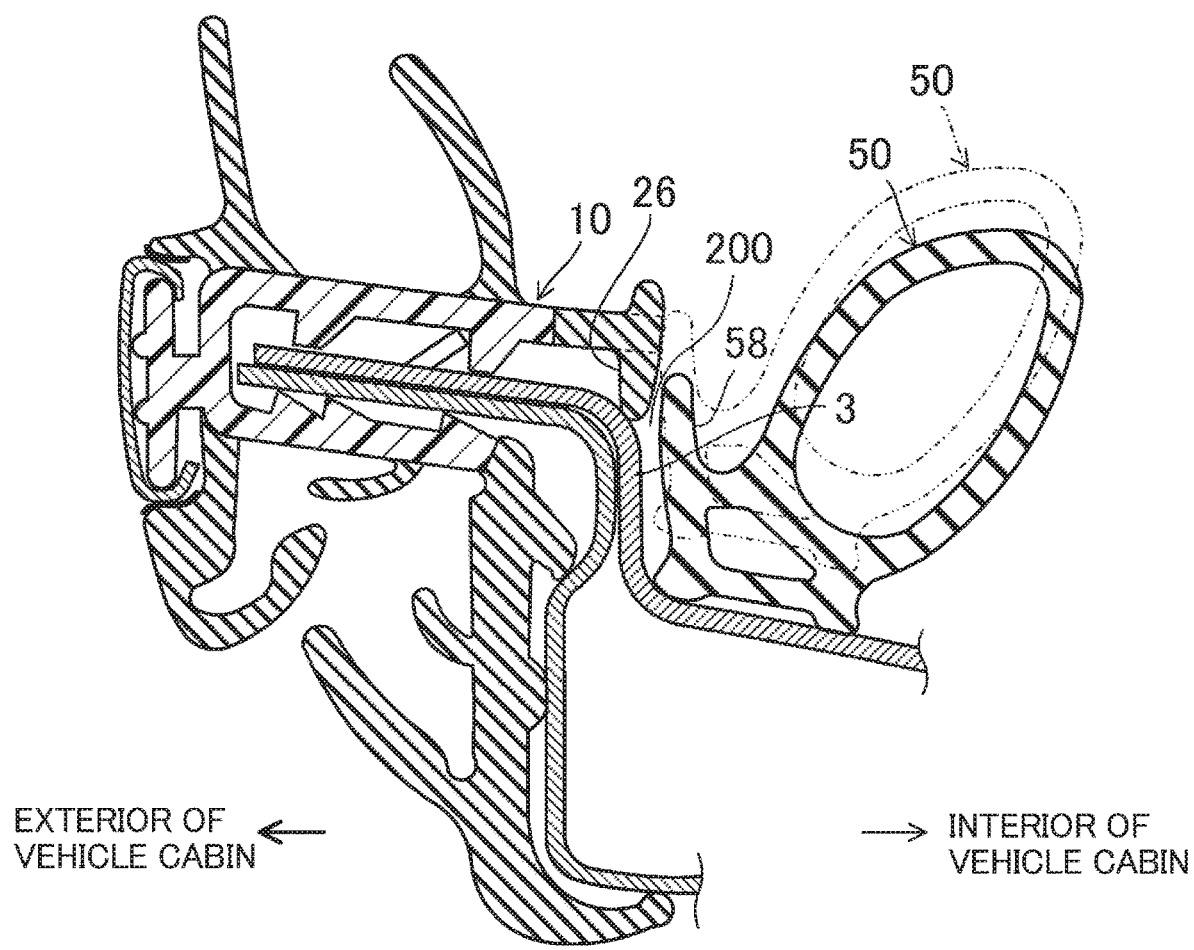
FIG. 11 is a view illustrating a positional relation between a rear portion of the glass run and a rear portion of the weather strip in a case in which the present disclosure is not applied.

The center portions of the upper weather strip 51 and the upper glass run portion 11 in the front-rear direction extend generally parallel to each other in the front-rear direction, but the upper weather strip 51 extends downwardly apart from the upper glass run portion 11 toward the rear end (an end in the front-rear direction), or in other words, sealing members are gradually separated from each other, which is illustrated in FIGS. 10 and 11.

When the upper weather strip 51 is downwardly apart from the upper glass run portion 11, the outer sealing lip 58 of the weather strip 50 is apart from the end surface 21*d* of the upper plate portion 21 or the door panel sealing lip 26 of the glass run 10 as illustrated in FIG. 11, which in turn creates the groove 200 between the outer sealing lip 58 and the door panel sealing lip 26. Through the groove 200, water such as rain may enter the cabin.

Specific Structure of Door Panel Sealing Lip 26

Figure 5:
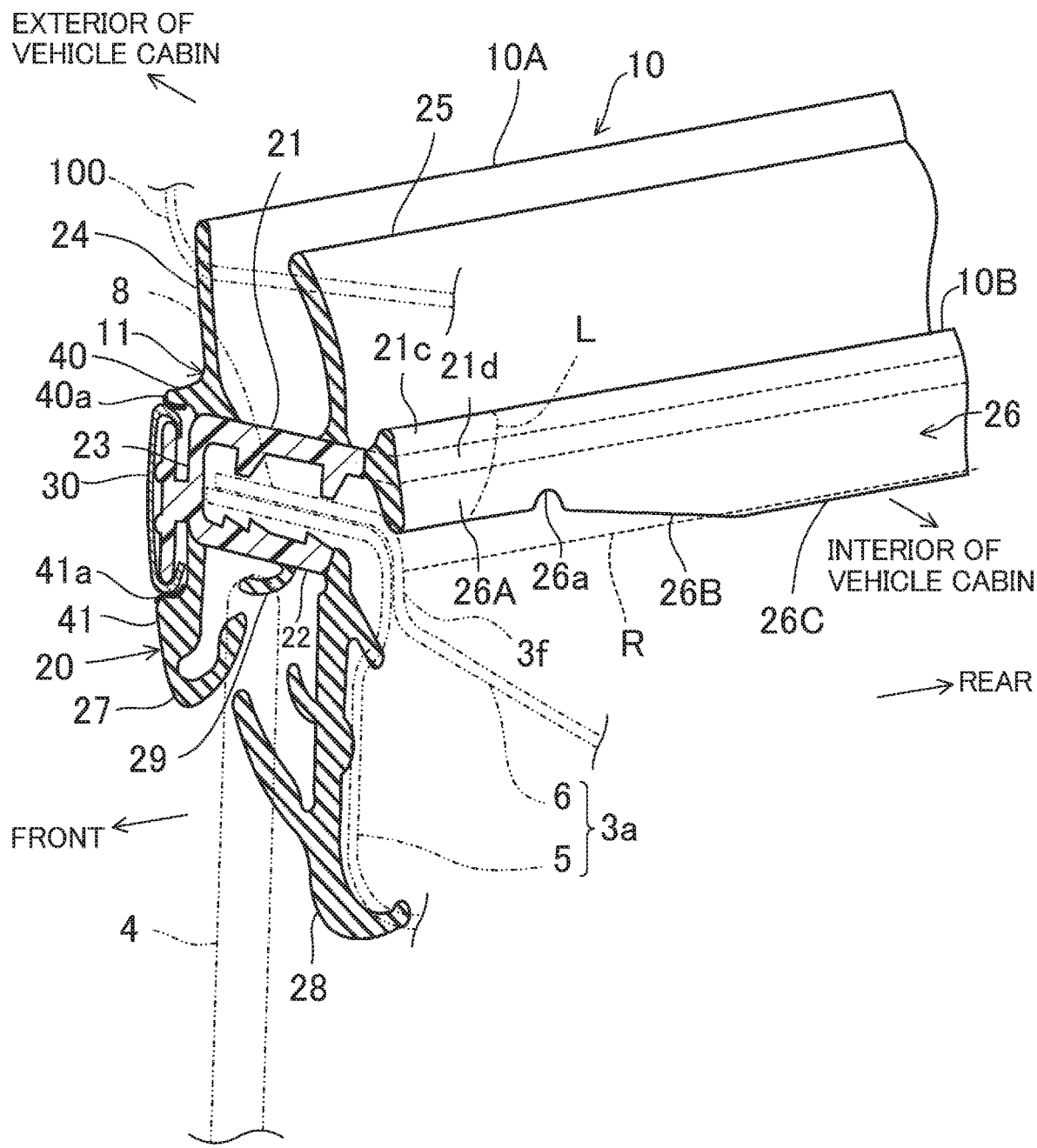
FIG. 5 is a perspective view of an upper glass run cut along line IV-IV in FIG. 3 seen from an interior of the vehicle cabin.

In this embodiment, the door panel sealing lip 26 is provided with a gradually varying portion 26B as illustrated in FIGS. 5 and 7 to substantially prevent formation of the groove 200. In other words, the door panel sealing lip 26 has the gradually varying portion 26B such that the downward protruding length of the door panel sealing lip 26 increases toward its rear end from a position immediately before the upper weather strip 51 is downwardly apart from the upper glass run portion 11. The door panel sealing lip 26 further includes a portion (referred to as a front portion 26A) in front of the gradually varying portion 26B and a portion (referred to as a rear portion 26C) behind the gradually varying portion 26B. The downward protruding length differs between the front portion 26A and the rear portion 26C.

Specifically, the downward projecting length of the rear portion 26C of the door panel sealing lip 26 is set to be longer than that of the front portion 26A of the door panel sealing lip 26. Therefore, the lower edge portion of the rear portion 26C is positioned below the lower edge portion of the front portion 26A. The gradually varying portion 26B extends from the front portion 26A to the rear portion 26C, and has a predetermined length in the front-rear direction so as to connect the front portion 26A and the rear portion 26C together. The lower edge portion of the gradually varying portion 26B extends downward toward the rear, and is continuous with the lower edge portion of the rear portion 26C. The gradually varying portion 26B and the rear portion 26C are provided, such that the groove 200 (illustrated in FIG. 11) is not formed between the outer sealing lip 58 and the door panel sealing lip 26 to enhance the sealing performance.

Figure 12:
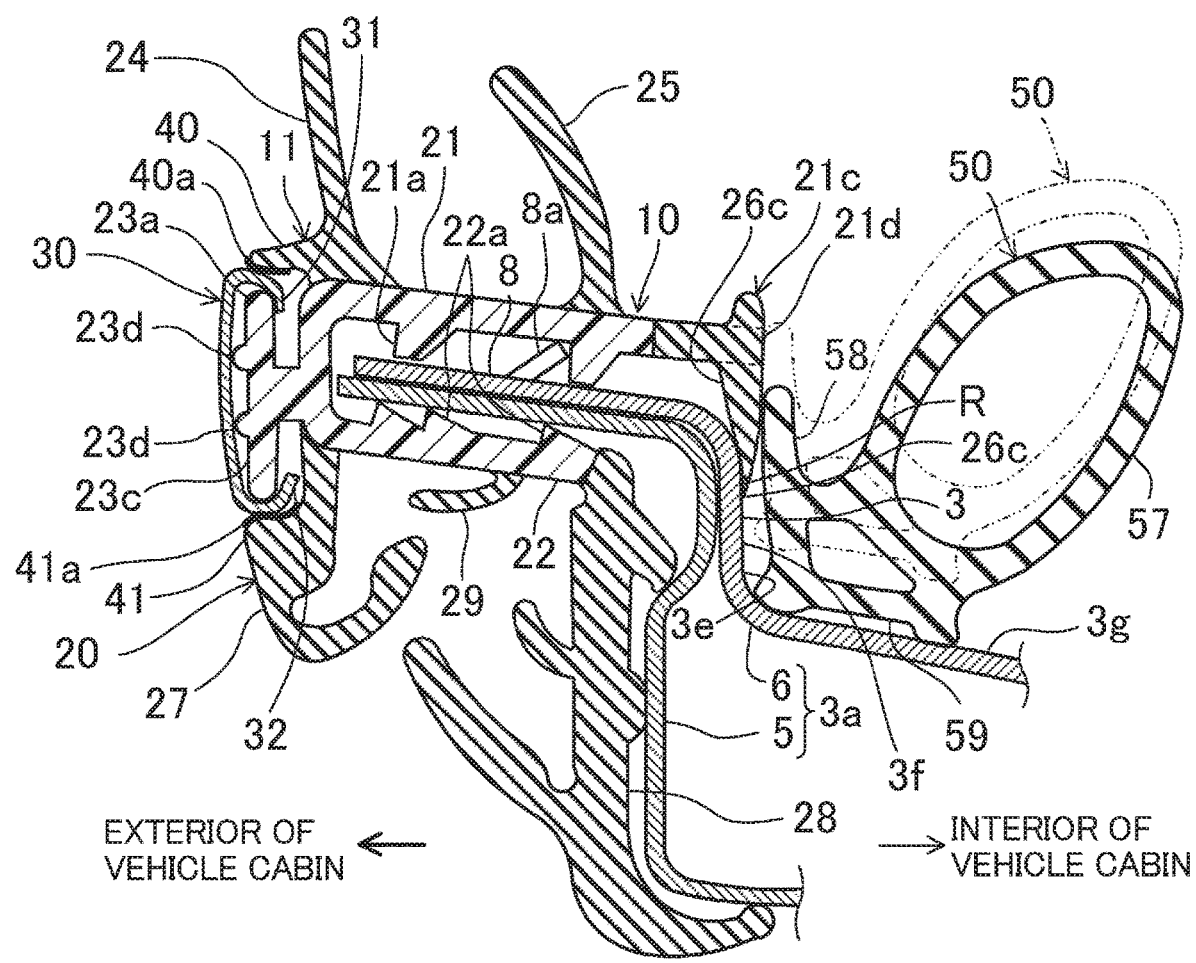
FIG. 12 is a cross-sectional view taken along the line XII-XII in FIG. 2.

As illustrated in FIG. 8, the gradually varying portion 26B of the door panel sealing lip 26 extends downward, and is tapered toward its lower end. Also, the gradually varying portion 26B of the door panel sealing lip 26 is disposed so as to contact the vertical surface 3f forming the step part 3e in the upper frame portion 3a from the interior of the cabin. As illustrated in FIG. 12, which is a cross-sectional view taken along line XII-XII in FIG. 2, the rear portion 26C of the door panel sealing lip 26 is also disposed so as to contact the vertical surface 3f from the interior of the cabin.

The gradually varying portion 26B and the rear portion 26C in the door panel sealing lip 26 are sandwiched between the vertical surface 3f of the step part 3e and the outer sealing lip 58 of the upper weather strip 51 in the thickness direction. This structure can provide a seal between the vertical surface 3f of the step part 3e in the upper frame portion 3a and the door panel sealing lip 26 and a seal between the door panel sealing lip 26 and the outer sealing lip 58.

The gradually varying portion 26B and the rear portion 26C are provided, such that, as indicated by the imaginary line S in FIG. 7, the contact portion of the upper weather strip 51 with the door panel sealing lip 26 continuously extends in the front-rear direction along the downwardly curved shape of the upper weather strip 51. Further, as illustrated in FIGS. 5, 7, and 12, the height position of the lower end of the rear portion 26C of the door panel sealing lip 26 is preferably set to be equal to or below a lower R stop position (indicated by the broken line R) of a curved portion connecting the glass run mount 8 and the vertical surface 3f together. By doing so, it is possible to minimize the step formed by the rear portion 26C of the door panel sealing lip 26 and the vertical surface 3f, and the imaginary line S crosses the line of the minimized step to further improve the water tightness.

As shown in FIG. 5, a notch 26A is provided at a start point of the gradually varying portion 26B in the door panel sealing lip 26 to extend upward from a lower end of the door panel sealing lip 26.

Instead of the notch 26A, a cutout (not illustrated) extending upward from the lower end of the door panel sealing lip 26. The cutout can be formed by, for example, a cutting blade. The notch 26A can be formed by, for example, a cutting blade by cutting off a part of the door panel sealing lip 26, or can be formed in the molding process, and whichever method may be used. In this embodiment, the notch 26A is provided in the die-molded portion 10B, and thus, the notch 26A can be obtained in the molding process for forming the die-molded portion 10B.

Since the gradually changing portion 26B of the door panel sealing lip 26 is not uniform in cross section, it is difficult to form this shape by the extrusion molding. However, by the die-molding, the gradually changing portion 26B can be tapered toward its lower end, or to make the lower end thereof as thin as possible like a sharp-edged tool. The gradually varying portion 26B can minimize or eliminate a gap (sealing gap) between the outer sealing lip 58 and the weather strip 50, the gap being generated at a position where the attached position of the entire weather strip 50 is gradually lowered and loses contact with the outer sealing lip 58. As a result, such a structure can further enhance the sealing properties.

In FIG. 8, which is a cross-sectional view taken along line VIII-VIII in FIG. 2, at least the gradually varying portion 26B may be formed using a die. Further, a portion below the lower plate portion 21 may also be molded using a molding die in order to conform to the shape of the vehicle body. The portion illustrated in FIG. 12 can also be the same as that illustrated in FIG. 8.

Advantages of Embodiment

As described above, according to the embodiment, the upper glass run portion 11 is mountable to the glass run mount 8 of the window frame 3 from the exterior of the cabin, and the upper weather strip 51 is mountable at a position located closer to the interior of the cabin than the glass run mount 8 of the window frame 3 is.

Since the center portions of the upper weather strip 51 and the upper glass run portion 11 in the front-rear direction extend generally parallel to each other in the front-rear direction, the outer sealing lip 58 of the upper weather strip 51 comes in contact with the gradually varying portion 26B and the rear portion 26C of the door panel sealing lip 26 of the upper glass run portion 11, thereby substantially preventing water from entering the cabin. The upper weather strip 51 extends downwardly apart from the upper glass run portion 11 toward its end. In accordance with this form, the gradually varying portion 26B of the door panel sealing lip 26 can be provided. As a result, the gradually varying portion 26B and the rear portion 26C of the door panel sealing lip 26 come in contact with the outer sealing lip 58 of the upper weather strip 51 to substantially prevent water from entering the cabin.

Other Embodiments

The embodiment described above is a mere example in every respect, and shall not be interpreted in a limited manner. Any modification and change equivalent to the scope of claims fall within the scope of the present disclosure.

Although not specifically described, the present disclosure can also be used for a front corner of the front door. In other words, in the mounting structure of the glass run 10 and the weather strip 50, separation of the weather strip 50 from the glass run 10 at the weather strip rear corner 55 may occur at the weather strip front corner 56, too.

Although not illustrated, the present disclosure is also applicable to, e.g., a rear door. In other words, with regard to the rear door, the glass run linearly extends toward the front of the vehicle at the upper side of the window frame, but the weather strip curvilinearly extends downward toward the front end of the window frame, which is a typical automobile structure. This structure creates a gap as described above and water such as rain may enter the vehicle cabin through the gap. According to the present disclosure, the door panel sealing lip of the upper glass run portion has the gradually varying portion, and this allows the outer sealing lip of the upper weather strip to contact the gradually varying portion and the rear portion of the door panel sealing lip of the upper glass run portion to substantially prevent water from entering the cabin. Further, the gradually varying portion and the rear portion of the door panel sealing lip come into contact with the outer sealing lip of the upper weather strip to substantially prevent water from entering the cabin.

As described above, the automobile door sealing structure according to the present disclosure can be used for all the portions suffering from separation of sealing members.

What is claimed is:

1. An automobile door sealing structure comprising:
a glass run mounted to a window frame defining a window opening of an automobile door to provide a seal between the window frame and a window glass; and
a weather strip mounted to the window frame and located closer to a cabin than the glass run is, wherein
the glass run includes an upper glass run portion extending in a front-rear direction of a vehicle along an upper frame portion of the window frame,
the upper glass run portion includes a glass run body having an insertion groove into which a glass run mount of the upper frame portion is inserted,
the glass run body includes an upper plate portion extending along an upper surface of the glass run mount, a lower plate portion extending along a lower surface of the glass run mount, and an exterior plate portion extending from an exterior end of the upper plate portion to an exterior end of the lower plate portion,
the glass run body has a door panel sealing lip protruding downward from an interior end of the upper plate portion to contact the upper frame portion, the door panel sealing lip extending in the front-rear direction,
the weather strip includes an upper weather strip extending in the front-rear direction along the upper frame portion, and mounted to a lower portion of a step part in the upper frame portion, the step part being located closer to the cabin than the glass run mount is, and having an exterior upper portion away from the cabin and an interior lower portion closer to the cabin,
the upper weather strip includes a hollow seal part configured to elastically deform upon compression by a vehicle body and an outer sealing lip protruding upward from an exterior part of the hollow seal part to contact an interior end surface of the upper plate portion and an interior part of the door panel sealing lip of the glass run body,
center portions of the upper weather strip and the upper glass run portion in the front-rear direction extend generally parallel to each other in the front-rear direction, and the upper weather strip extends downwardly away from the upper glass run portion in the front-rear direction to form a gap between the upper weather strip and the upper glass run portion, and
the door panel sealing lip has a gradually varying portion with a protruding length or width substantially perpendicular to the upper plate portion, wherein the protruding length or width gradually increases toward an end of the door panel sealing lip in the front-rear direction starting from a position immediately before where the upper weather strip extends downwardly away from the upper glass run portion such that the gradually varying portion spans the gap to restrict water intrusion through the gap.

2. The automobile door sealing structure of claim 1, wherein
the center portion of the upper glass run portion in the front-rear direction is an extrusion-molded portion molded by extrusion, and a portion of the upper glass run portion, located closer to an end in the front-rear direction than the extrusion-molded portion is, is a die-molded portion molded using an openable die, and the gradually varying portion is provided in the die-molded portion.

3. The automobile door sealing structure of claim 1, wherein
the gradually varying portion of the door panel sealing lip is tapered toward a lower end of the gradually varying portion.

4. The automobile door sealing structure of claim 1, wherein
a start point of the gradually varying portion is a cutout or a notch formed upward from a lower end of the door panel sealing lip.

5. The automobile door sealing structure of claim 1, wherein
the gradually varying portion is disposed so as to contact a vertical surface forming the step part in the upper frame portion from an interior of the cabin.

6. The automobile door sealing structure of claim 5, wherein
the gradually varying portion is sandwiched between the vertical surface and the outer sealing lip in a thickness direction.

7. The automobile door sealing structure of claim 1, wherein
the weather strip is made of an elastically deformable material.

8. The automobile door sealing structure of claim 1, wherein
at the position where the upper weather strip starts to extend downwardly away from the upper glass run portion, the upper glass run portion extends linearly in the front-rear direction.

* * * * *